I. S. & C. N. Brown,
Saw Teeth,

N°50,553.  Patented Oct. 24, 1865.

Witnesses:
William Pond.
Geo. H. Bernheim.

Inventors:
Ira S. Brown.
Charles N. Brown.

UNITED STATES PATENT OFFICE.

IRA S. BROWN AND CHAS. N. BROWN, OF WESTERLY, RHODE ISLAND.

IMPROVEMENT IN SAWS.

Specification forming part of Letters Patent No. 50,553, dated October 24, 1865.

*To all whom it may concern:*

Be it known that we, IRA S. BROWN and CHARLES N. BROWN, of Westerly, in the county of Washington and State of Rhode Island, have invented certain new and useful Improvements in Saws; and we do hereby declare that the following is a full and accurate description thereof, reference being had to the accompanying drawings, in which—

Figure 1:
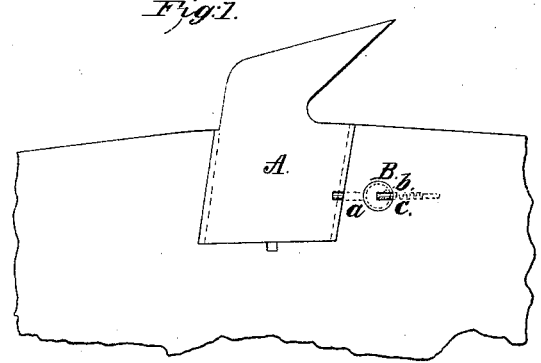
Figure 2:
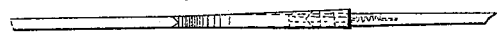
Figure 3:
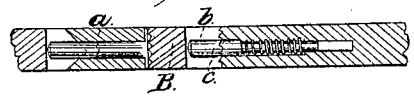
Figure 4:
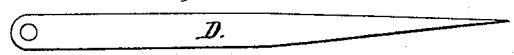

Figure 1 is an elevation of a portion of a circular saw having our improvements attached. Fig. 2 is an edge view of the same. Fig. 3 is an enlarged section of the lock for fastening the teeth in place, and Fig. 4 is a view of a key for operating the lock.

Saws as usually constructed, with the teeth cut from the saw-plate itself, are necessarily made of a sufficient softness of temper to admit of being filed for the purpose of sharpening the teeth, which softness causes them to wear more rapidly and require more frequent sharpening, while it, together with the imperfect cutting-edge thus produced, causes the saw to tear the wood instead of cutting it, thereby wasting a large proportion of the power exerted in operating it.

Saw-teeth have been made in separate pieces from the plate and fastened therein, but, so far as we are aware, they have never, previous to our invention, been adapted to be removed without first removing the rivet or screw by which they are held in place. Being once fastened in the saw, they have generally been treated as if a portion of the plate itself, been sharpened by a file in the ordinary manner, and removed only when worn out.

In our invention the teeth are made in any desirable form, and adapted, by means to be hereinafter described, to be fastened in the plate in such a manner as to be readily removed without removing the locking device. They are then tempered to a proper hardness for cutting the material on which they are to operate, and sharpened on a grindstone and oilstone to a fine cutting-edge, in the same manner that a chisel or other tool would be sharpened. On being placed in the saw-plate and securely fastened therein they cut the wood, like so many plane-irons, with a very much less expenditure of power than is required by an ordinary saw, while their hardness enables them to do a much larger amount of work before requiring to be resharpened. When this becomes necessary, they may be quickly removed and sharpened with the same facility as any other tool without endangering the loss or derangement of the locking device.

Besides a great saving in power in operating and of time in sharpening, our invention produces a quality of work much superior to that of the saw ordinarily employed, which is due to the fine cutting-edge our teeth are capable of receiving, cutting a smooth kerf instead of tearing and crowding their way through the wood. This will at once be evident to all who have noticed the difference between the work of a sharp and a dull saw of the ordinary construction.

The device employed by us for locking the teeth in the saw-plate is clearly represented in the drawings. The teeth are formed with grooves in their edges adapted to receive tongues on the saw-plate, as represented, which hold them firmly in place except in a radial direction. To fasten them in this direction we employ a sliding-bolt, $a$, fitted to enter a corresponding hole in the edge of the tooth. This bolt is kept in place by a tumbler, B, which is adapted to revolve in the saw-plate at the end of the bolt $a$, and having a recess, $b$, in one side, as shown in Fig. 1. When this recess is opposite the bolt $a$ the latter may be retired therein and the tooth released, but when it is turned in any other position the bolt $a$ is firmly secured, and the tooth cannot be removed. The tumbler B is fitted so as to revolve in the plate without being liable to displacement in the direction of its axis by means of a screw cut on its periphery, fitting a female screw in the plate, and so arranged that when the recess $b$ is opposite the bolt $a$ the surfaces will be flush with the surfaces of the plate.

To prevent the friction or jarring when in action from turning the tumbler B so as to release the tooth, we employ a spring catch or bolt, $c$, which enters the recess and prevents its turning until the spring-catch is forced back. By placing the locking device in the rear of the tooth the motion of the saw tends to assist the spring in holding the catch in the recess $b$. The bolt $a$ is formed with a head on the end next the tumbler B, which prevents it from falling out and becoming misplaced when the tooth is removed. This bolt should be made of a length equal to the diameter of the tumbler B, to enable it to be entered when the tumbler is removed, and when the tumbler is in place the bolt cannot be removed.

The operation of this lock is as follows: A wedge-shaped key, D, (shown in Fig. 4,) fitted to fill the recess in tumbler B, is forced in behind the spring-catch c, thus retiring it, and permitting the tumbler B to be turned by the same key until the recess is opposite the bolt a. The key D is then removed from the recess and employed to force back the bolt a, when the tooth is released and may be removed in a radial direction by means of the key D, placed in the recess of its base. For fastening the tooth this operation is reversed.

The locking device may be located in the tooth instead of in the plate; but we prefer it as represented, as it will then answer for any number of different teeth which may be fitted in the same plate.

We do not claim a saw-tooth made in a separate piece from the saw-plate, as that is well known; but,

Having now fully described our invention, what we do claim as new, and desire to secure by Letters Patent, is—

1. In combination with a saw-plate and removable tooth, a locking device adapted to lock or fasten the tooth after being placed in position, and arranged to admit of the removal of the tooth without necessitating the removal of the locking device from the tooth or plate, in whichever it is situated, all substantially as herein described.

2. The bolt a, tumbler B, and spring-catch c, or their equivalents, in combination with a removable saw-tooth and a saw-plate, substantially as and for the purpose herein set forth.

IRA S. BROWN.
CHARLES N. BROWN.

Witnesses to the signature of Ira S. Brown:
WILLIAM POND,
MELVILLE L. POND.

Witnesses to the signature of Charles N. Brown:
THOS. A. DOYLE,
GEO. H. BURNHAM.